(12) United States Patent
Wu (10) Patent No.: US 11,073,893 B2
(45) Date of Patent: Jul. 27, 2021

(54) SYSTEM AND METHOD CAPABLE OF REMOTELY CONTROLLING ELECTRONIC APPARATUS

(71) Applicant: INNODISK CORPORATION, New Taipei (TW)

(72) Inventor: Chih-Ching Wu, New Taipei (TW)

(73) Assignee: Innodisk Corporation, New Taipei (TW)

(*) Notice: Subject to any disclaimer, the term of this patent is extended or adjusted under 35 U.S.C. 154(b) by 0 days.

(21) Appl. No.: 16/813,987

(22) Filed: Mar. 10, 2020

(65) Prior Publication Data

US 2021/0081024 A1   Mar. 18, 2021

(30) Foreign Application Priority Data

Sep. 17, 2019   (TW) .................................. 108133474

(51) Int. Cl.
| | |
|---|---|
| *G06F 1/3234* | (2019.01) |
| *G06F 9/4401* | (2018.01) |
| *G06F 12/02* | (2006.01) |
| *G06F 11/07* | (2006.01) |
| *G06F 13/38* | (2006.01) |
| *H04L 29/08* | (2006.01) |
| *G06F 1/24* | (2006.01) |

(52) U.S. Cl.
CPC .............. *G06F 1/3243* (2013.01); *G06F 1/24* (2013.01); *G06F 9/4406* (2013.01); *G06F 9/4416* (2013.01); *G06F 11/0736* (2013.01); *G06F 11/0793* (2013.01); *G06F 12/0246* (2013.01); *G06F 13/385* (2013.01); *H04L 67/1097* (2013.01); *G06F 2213/0002* (2013.01); *G06F 2213/0016* (2013.01); *G06F 2213/0026* (2013.01); *G06F 2213/0032* (2013.01)

(58) Field of Classification Search
USPC ......................................................... 713/320
See application file for complete search history.

(56) References Cited

U.S. PATENT DOCUMENTS

| | | | | |
|---|---|---|---|---|
| 9,942,837 | B2* | 4/2018 | Zakaria ................... | H04W 4/80 |
| 10,681,638 | B2* | 6/2020 | Kim ........................ | H04L 63/08 |
| 10,959,175 | B2* | 3/2021 | Liu ......................... | H04W 68/02 |

(Continued)

*Primary Examiner* — Paul R. Myers
(74) *Attorney, Agent, or Firm* — Rosenberg, Klein & Lee (57) ABSTRACT

The invention provides a system capable of remotely controlling electronic apparatus. The system comprises a cloud management platform and an electronic apparatus. The electronic apparatus comprises a motherboard and a data storage device. The motherboard comprises a standby power circuit. A standby power is supplied to the data storage device via the standby power circuit. The data storage device comprises a data storage unit and a program management unit. The program management unit comprises a microprocessor and a network communication component. Whether the electronic apparatus is in a power-on state or a power-off state, the data storage device can always maintain in a normal operation via the standby power. When the microprocessor of the program management unit receives a specific operation instruction from the cloud control platform, it will execute a corresponding operation program according to the specific operation instruction.

18 Claims, 6 Drawing Sheets

(56) References Cited

U.S. PATENT DOCUMENTS

| | | | |
|---|---|---|---|
| 2014/0120961 A1* | 5/2014 | Buck | H04W 4/12 |
| | | | 455/466 |
| 2014/0359343 A1* | 12/2014 | Fu | G06F 11/2033 |
| | | | 714/4.12 |
| 2015/0089497 A1* | 3/2015 | Borzycki | G06F 9/45533 |
| | | | 718/1 |
| 2016/0105510 A1* | 4/2016 | Lin | H04L 67/1097 |
| | | | 709/217 |
| 2016/0174148 A1* | 6/2016 | Seed | H04W 40/005 |
| | | | 370/311 |
| 2016/0202744 A1* | 7/2016 | Castro-Leon | G06F 1/3287 |
| | | | 713/310 |
| 2017/0177870 A1* | 6/2017 | Hildebrand | G06F 21/81 |
| 2017/0181088 A1* | 6/2017 | Kim | H04W 12/06 |
| 2017/0353365 A1* | 12/2017 | Li | H04W 24/08 |
| 2018/0219742 A1* | 8/2018 | Fainberg | H04L 43/10 |
| 2018/0234493 A1* | 8/2018 | Ye | G06F 9/5088 |
| 2018/0239678 A1* | 8/2018 | Kusumoto | H04L 41/0668 |
| 2020/0137168 A1* | 4/2020 | Hong | H04L 67/1097 |
| 2021/0067428 A1* | 3/2021 | Floyd | H04L 41/069 |

* cited by examiner

SYSTEM AND METHOD CAPABLE OF REMOTELY CONTROLLING ELECTRONIC APPARATUS

This non-provisional application claims priority claim under 35 U.S.C. § 119(a) on Taiwan Patent Application No. 108133474 filed Sep. 17, 2019, the entire contents of which are incorporated herein by reference.

FIELD OF THE INVENTION

The present invention relates to a system and method capable of remotely controlling electronic apparatus, more particularly, a system and method capable of remotely controlling an electronic apparatus when the electronic apparatus is in a power-off state.

BACKGROUND

With the needs of life, unattended electronic devices such as vending machines, advertising machines, monitors, etc. are often seen on the road. In the past, when the operating system of these electronic apparatus was crashed or damaged, the engineer had to go to the installation location of the electronic apparatus in person to repair the operating system of the electronic device, for example, restarting or restoring the operating system of the electronic apparatus. If the installation location of the electronic apparatus is very remote, it will cause a serious burden on the repairing work of operating system.

Nowadays, the advanced electronic apparatus is often equipped with a network communication module. The remote manager can directly update the internal data of the electronic apparatus or execute one or more specific operations to the electronic apparatus via the network communication module. However, the remote manager is unable to control the electronic apparatus to execute any operation when the electronic apparatus is in a power-off state, it is necessary to send personnel to the installation location of the electronic apparatus to proceed a boot of the electronic apparatus, and only in this way that the remote manager can continue to execute the specific operation program to the electronic apparatus.

SUMMARY

It is one objective of the present invention to provide a system and method capable of remotely controlling electronic apparatus, wherein the system comprises a cloud management platform and at least one electronic apparatus. The electronic apparatus comprises a data storage device and a motherboard. The data storage device comprises a data storage unit and a program execution management unit. The motherboard is provided with a standby power circuit that can always keep to supply power. Whether the electronic apparatus is in a power-on state or in a power-off state, the standby power can be always supplied to the data storage device in the electronic apparatus via the standby power circuit so that the data storage device can always maintain in a normal operation.

It is another objective of the present invention to provide a system and method capable of remotely controlling electronic apparatus, wherein when the electronic apparatus is in the power-off state, the cloud management platform sends a boot instruction to the data storage device in the electronic apparatus, the program execution management unit executes a boot operation program for the electronic apparatus according to the boot instruction, such that the electronic apparatus that was in the power-off state originally can be rebooted to enter a power-on state.

To achieve the above objective, the present invention provides an system capable of remotely controlling electronic apparatus, comprising: a cloud management platform comprising a management interface; and an electronic apparatus comprising: a motherboard comprising a standby power circuit; and a data storage device, connected to the standby power circuit, and comprising a data storage unit and a program execution management unit, wherein the data storage unit comprises a plurality of flash memories and a controller connected to the flash memories, the program execution management unit comprises a microprocessor and a network communication component connected to the microprocessor, and is communicated with the cloud management platform via the network communication component, the microprocessor of the program execution management unit is connected to the controller of the data storage unit via a connection line; wherein a standby power is supplied to the data storage device via the standby power circuit, the data storage device can maintain in a normal operation via the standby power whether the electronic apparatus is in a power-on state or a power-off state; when the cloud management platform transmits a specific operation instruction to the program execution management unit, the microprocessor of the program execution management unit executes a corresponding operation program according to the specific operation instruction, or transmits the specific operation instruction to the data storage unit via the connection line to request that the controller of the data storage unit executes the corresponding operation program according to the specific operation instruction.

In one embodiment of the present invention, wherein the electronic apparatus further comprises an electronic component unit, the motherboard further comprises a main power circuit, the electronic component unit is disposed on the motherboard and connected to the main power circuit; when the electronic apparatus is in the power-on state, a main power is supplied to the electronic component unit via the main power circuit; when the electronic apparatus is in the power-off state, the main power circuit will be cut off, and therefore the main power is unable to be supplied to the electronic component unit.

In one embodiment of the present invention, the system comprises a power supply device that is connected to the main power circuit and the standby power circuit of the motherboard, and used to provide the main power and the standby power.

In one embodiment of the present invention, the microprocessor of the program execution management unit is equipped with an embedded system, the cloud management platform can control and manage the execution of the operation program via the embedded system of the program execution management unit.

In one embodiment of the present invention, the specific operation instruction sent from the cloud management platform is a boot instruction, the microprocessor further comprises a power-on pin connected to a power switch pin disposed on the motherboard; when the electronic apparatus is in the power-off state and the program execution management unit receives the boot instruction from the cloud management platform, the microprocessor of the program execution management unit transmits a boot signal to the power switch pin via the power-on pin so as to execute a boot program for the electronic apparatus.

In one embodiment of the present invention, the flash memories are formed with a data sector, the data sector comprises a first data partition and a second data partition, an operating system is installed in the first data partition, the second data partition stores an operating system restoring file, the specific operation instruction sent from the cloud management platform is an operating system repairing instruction; when the program execution management unit receives the operating system repairing instruction, the microprocessor of the program execution management unit sends the operating system repairing instruction to the controller of the data storage unit, and therefore requests that the controller of the data storage unit executes an operation program for repairing the operating system according to the operating system repairing instruction so as to restore the operating system of the first data partition by the operating system restoring file of the second data partition.

In one embodiment of the present invention, the microprocessor of the program execution management unit is equipped with an embedded system used for monitoring an operation condition of the operating system; when the embedded system of the microprocessor monitors that the operating system installed in the data storage unit is abnormal, the embedded system of the microprocessor reports an operating system fault message to the cloud management platform, and then the cloud management platform transmits the operating system repairing instruction to the program execution management unit according to the operating system fault message.

In one embodiment of the present invention, the microprocessor of the program execution management unit further comprises an input and output pin connected to a reset pin disposed on the motherboard; after the operating system has been restored, the microprocessor of the program execution management unit sends a reset signal to the reset pin via the input and output pin to execute a reboot operation for the electronic apparatus.

In one embodiment of the present invention, the specific operation instruction sent from the cloud management platform is an instruction for collecting health information of the data storage device; when the program execution management unit receives the instruction for collecting health information of the data storage device, the microprocessor of the program execution management unit sends the instruction for collecting health information of the data storage device to the controller of the data storage unit via the connection line, and requests that the controller of the data storage unit executes an operation program for collecting health information of the data storage device according to the instruction for collecting health information of the data storage device so as to generate a file containing the health information of the data storage device; afterwards, the program execution management unit receives the file containing the health information of the data storage device from the controller via the connection line, and transmits the file containing the health information of the data storage device to the cloud management platform via the network communication component.

In one embodiment of the present invention, the specific operation instruction sent from the cloud management platform is an updating firmware instruction including a firmware updating file; when the program execution management unit receives the updating firmware instruction, the microprocessor of the program execution management unit transmits the updating firmware instruction to the controller of the data storage unit to require that the controller of the data storage unit executes an updating firmware operation program according to the updating firmware instruction, and thus the controller of the data storage unit updates a firmware by the firmware updating file of the updating firmware instruction.

In one embodiment of the present invention, the connection line is a connection line conforming to RS232 specification, UART specification, or I2C specification.

In one embodiment of the present invention, the data storage device is a data storage device having a SATA transmission interface, a PCIe transmission interface or an M.2 transmission interface.

In one embodiment of the present invention, the network communication component is a WiFi communication component, an Ethernet communication component, or a 3G, 4G or 5G communication component.

The present invention further provides a method capable of remotely controlling electronic apparatus, which is applied to a system capable of remotely controlling electronic apparatus, the system comprises a cloud management platform and an electronic apparatus, the electronic apparatus comprises a motherboard and a data storage device, the motherboard comprises a standby power circuit, the data storage device comprises a data storage unit and a program execution management unit, the data storage unit comprises a plurality of flash memories and a controller, the program execution management unit comprises a microprocessor that is having a network communication function and equipped with an embedded system, the method capable of remotely controlling the electronic apparatus comprising steps of: supplying a standby power to the data storage device via the standby power circuit when the electronic apparatus is in a power-on state or in a power-off state; requiring the program execution management unit to be communicated with the cloud management platform; requiring the program execution management unit to receive a specific operation instruction sent from the cloud management platform; and requiring the program execution management unit to execute a specific operation program according to the specific operation instruction, or transmit the specific operation instruction to the controller of the data storage unit to request that the controller of the data storage unit executes the corresponding operation program according to the specific operation instruction.

DETAILED DESCRIPTION OF THE PREFERRED EMBODIMENTS

Figure 1:
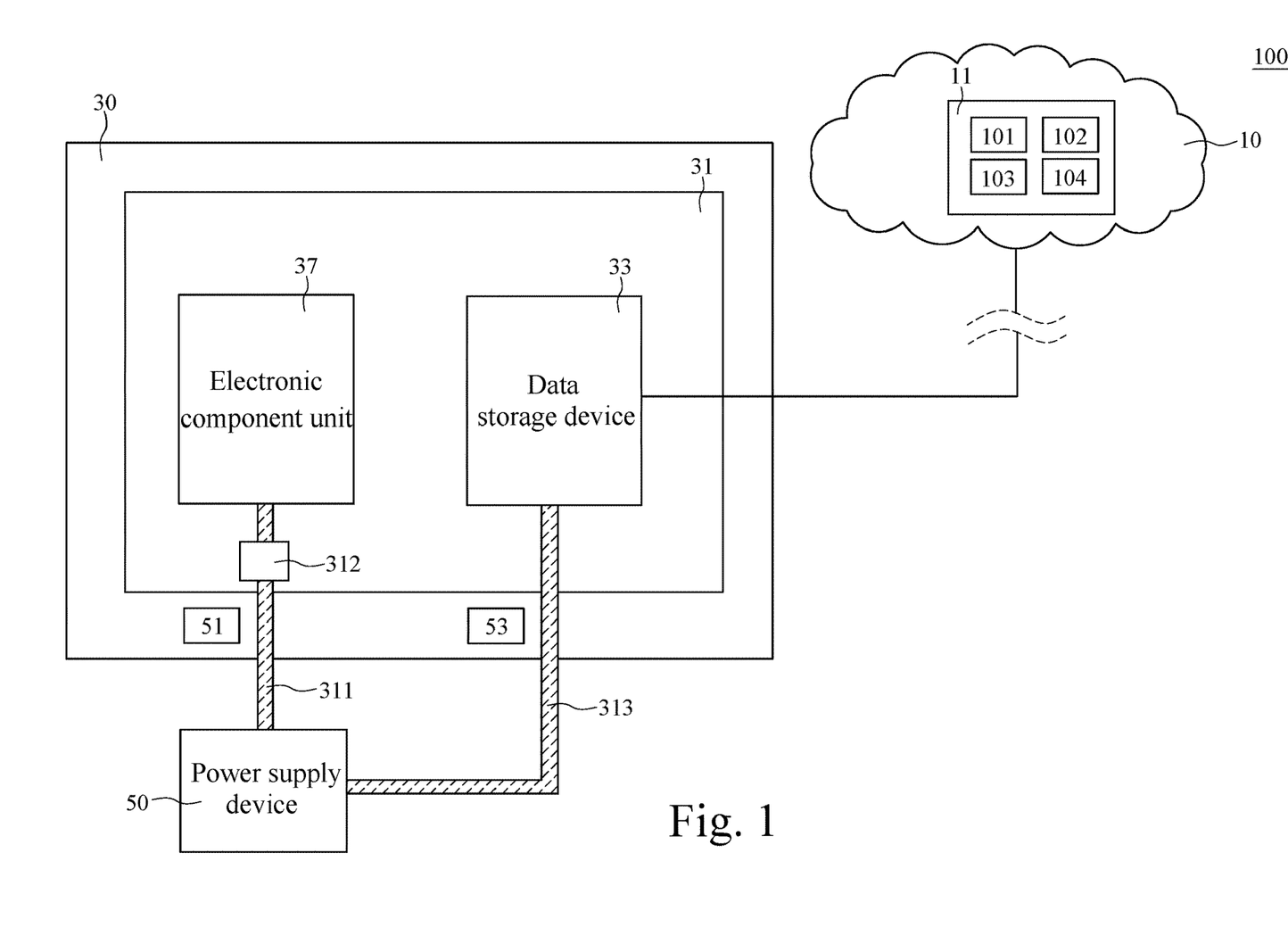
FIG. 1 is an architecture diagram of a system of the present invention, wherein the system is capable of remotely controlling the electronic apparatus.
Figure 2:
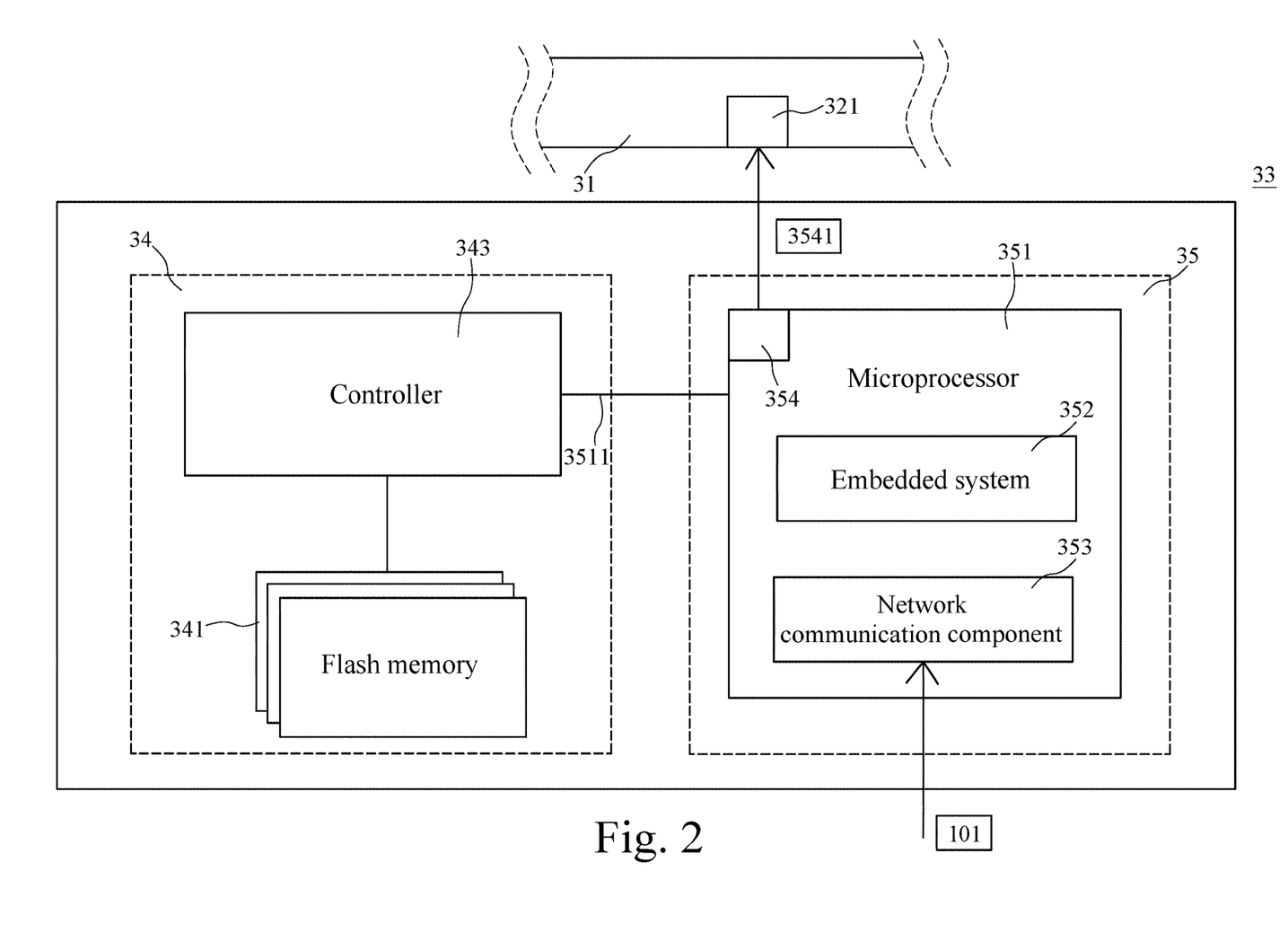
FIG. 2 is a circuit diagram of the electronic apparatus according to one embodiment of the present invention.

Referring to FIG. 1 and FIG. 2, there are shown an architecture diagram of a system capable of remotely controlling the electronic apparatus according to the present invention, and a circuit diagram of the electronic apparatus according to one application embodiment of the present invention, respectively. As shown in FIG. 1 and FIG. 2, the system 100 of the present invention comprises a cloud management platform 10 and at least one electronic apparatus 30. The electronic apparatus 30 is an industrial computer, a vending machine, an advertising machine, a monitor, a POS (Point of Sale) machine, a monitor, or other equipment with specific purpose. A manager of the cloud management platform 10 can remotely control the electronic apparatus 30 so that the electronic apparatus 30 can execute a specific operation program.

The electronic apparatus 30 comprises a motherboard 31, a data storage device 33, and an electronic component unit 37. The motherboard 31 is provided with a main power circuit 311 and a standby power circuit 313 thereon. A power switch 312 is configured on the main power circuit 311. The data storage device 33 may be a solid state disk (SSD) having a SATA transmission interface, a PCIe transmission interface or an M.2 transmission interface, or may be other forms of storage device capable of storing data. The electronic component unit 37 may be common electronic components provided on the motherboard 31, such as a CPU, a memory, a chip, a display card, a passive element, and the like. The data storage device 33 is electrically connected to the standby power circuit 313 on the motherboard 31, and the electronic component unit 37 is electrically connected to the main power circuit 311 on the motherboard 31.

The system 100 of the present invention further comprises a power supply device 50, which is disposed inside the electronic device 30 or disposed outside the electronic device 30. The power supply device 50 is a power supply, a UPS system, or an AC-to-DC power converter. The power supply device 50 is connected to the main power circuit 311 and the standby power circuit 313 on the motherboard 31, and used to provide a main power 51 and a standby power 53. When the electronic apparatus 30 is in a power-on state, the main power 51 is supplied to the electronic component unit 37 via the main power circuit 311, and the standby power 53 is supplied to the data storage device 33 via the standby power circuit 313. When the electronic apparatus 30 is in a power-off state, the power switch 312 of the main power circuit 311 will be cut off, such that the main power circuit 311 is broken circuit, and the main power 51 is unable to supply to the electronic component unit 37 via the main power circuit 311. In contrast, the standby power supply 53 can continue to be supplied to the data storage device 33 via the standby power circuit 313 when the electronic apparatus 30 is in the power-off state. In the present invention, the standby power circuit 313 is a power circuit that can always keep to supply power. Accordingly, whether the electronic apparatus 30 is in the power-on state or in the power-off state, the standby power 53 can be always supplied to the data storage device 33 in the electronic apparatus 30 via the standby power circuit 313 so that the data storage device 33 can always maintain in a normal operation.

Further, the data storage device 33 comprises a data storage unit 34 and a program execution management unit 35. The data storage unit 34 comprises a plurality of flash memories 341 and a controller 343. The controller 343 is connected to the flash memories 341. The program execution management unit 35 comprises a microprocessor 351. In one embodiment of the present invention, the microprocessor 351 is a chip with network communication function, for example, a network communication component 353 is integrated in the microprocessor 351. In another embodiment of the present invention, the microprocessor 351 and the network communication component 353 are independent components, respectively, and the microprocessor 351 is connected to the network communication component 353. The network communication component 353 is a WiFi communication component, an Ethernet communication component, a 3G, 4G or 5G communication component, or other networkable communication component. The program execution management unit 35 is communicated with the cloud management platform 10 via the network communication component 353. Besides, the microprocessor 351 is equipped with an embedded system 352, which is an architecture system of Linux or RTOS (such as QNX, VxWORK) and is stored in non-volatile memories (NVMs). The manager of the cloud management platform 10 can control and manage the specific operation program executed by the electronic apparatus 30 via the embedded system 352 of the program execution management unit 35. The microprocessor 351 of the program execution management unit 35 is connected to the controller 343 of the data storage unit 34 via a connection line 3511. The connection line 3511 may be a connection line conforming to RS232 specification, UART specification, or I2C specification.

When the manager of the cloud management platform 10 wants that the electronic apparatus 30 executes a specific operation, it will sends a specific operation instruction 101, 102, 103, or 104 to the electronic apparatus 30 by a management interface 11. The management interface 11 may be an application programming interface in WEB form (WEB App). After the program execution management unit 35 of the data storage device receives the specific operation instruction 101, 102, 103, or 104 sent from the cloud management platform 10 via the network communication component 353, the microprocessor 351 of the program execution management unit 35 executes a corresponding operation program according to the specific operation instruction 101, 102, 103, or 104, or the microprocessor 351 of the program execution management unit 35 transmits the specific operation instruction 101, 102, 103, or 104 to the data storage unit 34 via the connection line 3511 so as to require that the controller 343 of the data storage unit 34 executes the corresponding operation program according to the specific operation instruction 101, 102, 103, or 104.

In one application embodiment of the present invention, as shown in FIG. 1 and FIG. 2, the manager of the cloud management platform 10 transmits a boot instruction 101 to the electronic apparatus 30 via the management interface 11 so that the electronic apparatus 30 in the power-off state can execute a boot operation according to the boot instruction 101. In this application embodiment, the microprocessor 351 comprises a power-on pin 354 connected to a power switch pin 321 disposed on the motherboard 31. When the program execution management unit 35 receives the boot instruction 101 from the cloud management platform 10, the microprocessor 351 of the program execution management unit 35 transmits a boot signal 3541 to the power switch pin 321 so as to execute a boot operation program for the electronic apparatus 30. Thus, the electronic apparatus 30 that was in the power-off state originally can be rebooted to enter the power-on state. Accordingly, when the electronic apparatus 30 is in the power-off state, the manager of the cloud management platform 10 can execute the boot operation for the electronic apparatus 30 in a way of remotely controlling.

Figure 3:
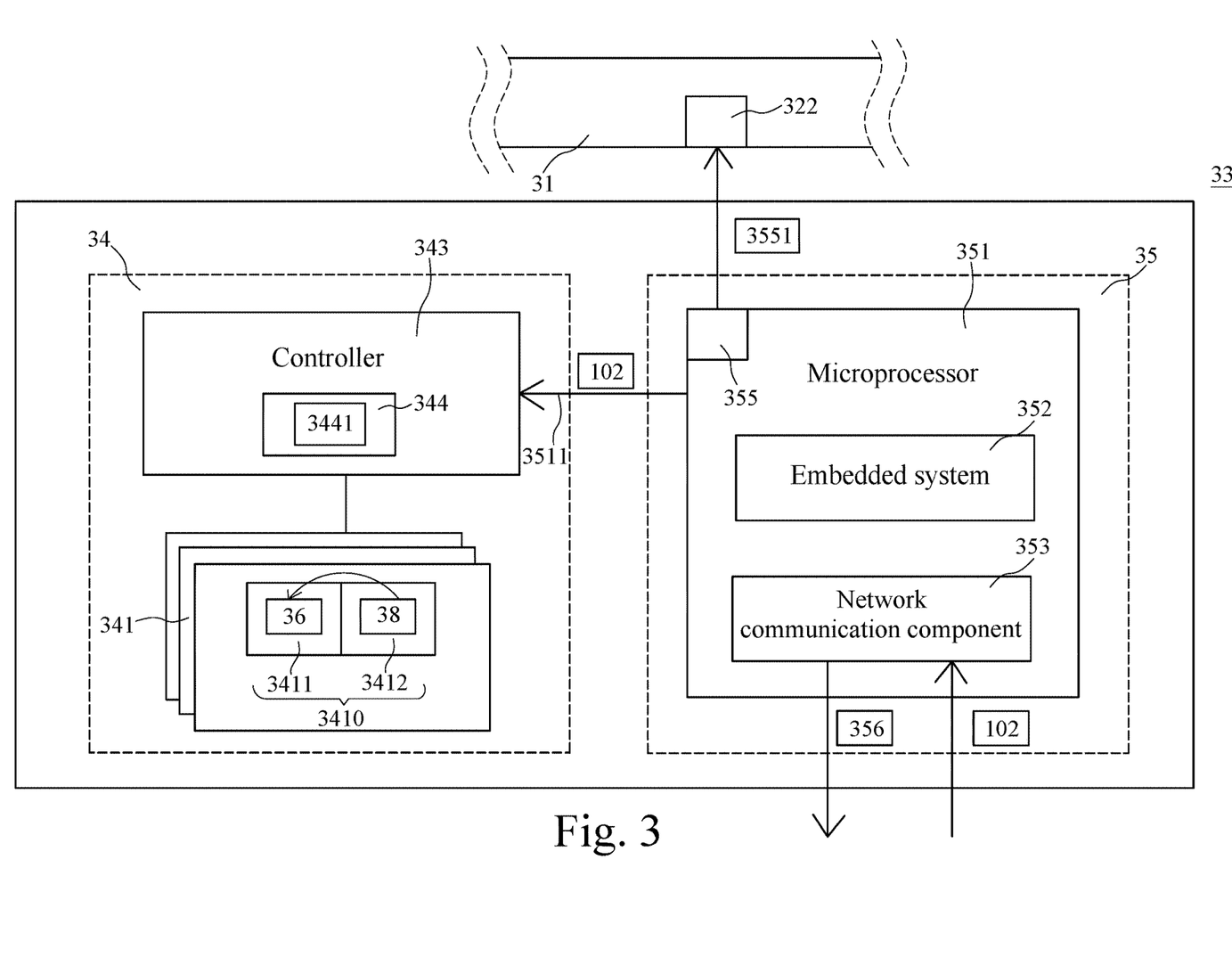
FIG. 3 is a circuit diagram of the electronic apparatus according to another embodiment of the present invention.

Referring to FIG. 3, there is a circuit diagram of the electronic apparatus according to another application embodiment of the present invention, and referring to FIG. 1, simultaneously. As shown in FIG. 1 and FIG. 3, the electronic apparatus 30 is installed with an operating system 36 by the flash memories 341 of the data storage unit 34. The embedded system 352 of the program execution management unit 35 is used to monitor the operation of the operating system 36. When the embedded system 352 of the program execution management unit 35 monitors that the operating system 36 is abnormal and therefore is unable to work, for example, file data of the operating system 36 is damaged, the microprocessor 351 of the program execution management unit 35 will report an operating system fault message 356 to the cloud management platform 10 via the network communication component 353. After the manager of the cloud management platform 10 receives the operating system fault message 356, he will know that the operating system 36 of the electronic apparatus 30 is unable to work, and then generate an operating system repairing instruction 102 by the management interface 11 and transmit the operating system repairing instruction 102 to the electronic apparatus 30.

The motherboard 31 is provided with a reset pin 322 thereon, and the microprocessor 351 further comprises an input and output pin 355. The microprocessor 351 is electrically connected to the reset pin 322 via the input and output pin 355. The flash memories 341 are formed with a data sector 3410. A first data partition 3411 and a second data partition 3412 are cut out from the data sector 3410. The operating system 36 is installed in the first data partition 3411. The second data partition 3412 stores an operating system restoring file 38. The controller 343 comprises a firmware 344, which defines an operation program 3441 for restoring operating system. When the microprocessor 351 of the program execution management unit 35 receives the operating system repairing instruction 102, it will transmit the operating system repairing instruction 102 to the controller 343 via the connection line 3511. After the controller 343 receives the operating system repairing instruction 102, it will execute the operation program 3441 to restore the operating system 36 in the first data partition 3411 by the operating system restoring file 38 in the second data partition 3412. Sequentially, the embedded system 352 of the program execution management unit 35 monitors that the operating system 36 has been restored by the system restore file 38, the microprocessor 351 further sends a reset signal 3551 to the reset pin 322 to execute the reboot operation program for the electronic apparatus 30. Afterwards, the operating system 36 restored will be restarted and resume normal operation.

Accordingly, whether the electronic apparatus 30 is in the power-on state or the power-off state, the program execution management unit 35 of the data storage device 33 will actively report the operating system fault message 356 to the cloud management platform 10 when the operating system 36 of the electronic apparatus 30 has damaged; after receiving the operating system fault message 356, the manager of the cloud management platform 10 can execute the repairing operation program of the operating system 36 by the program execution management unit 35.

Figure 4:
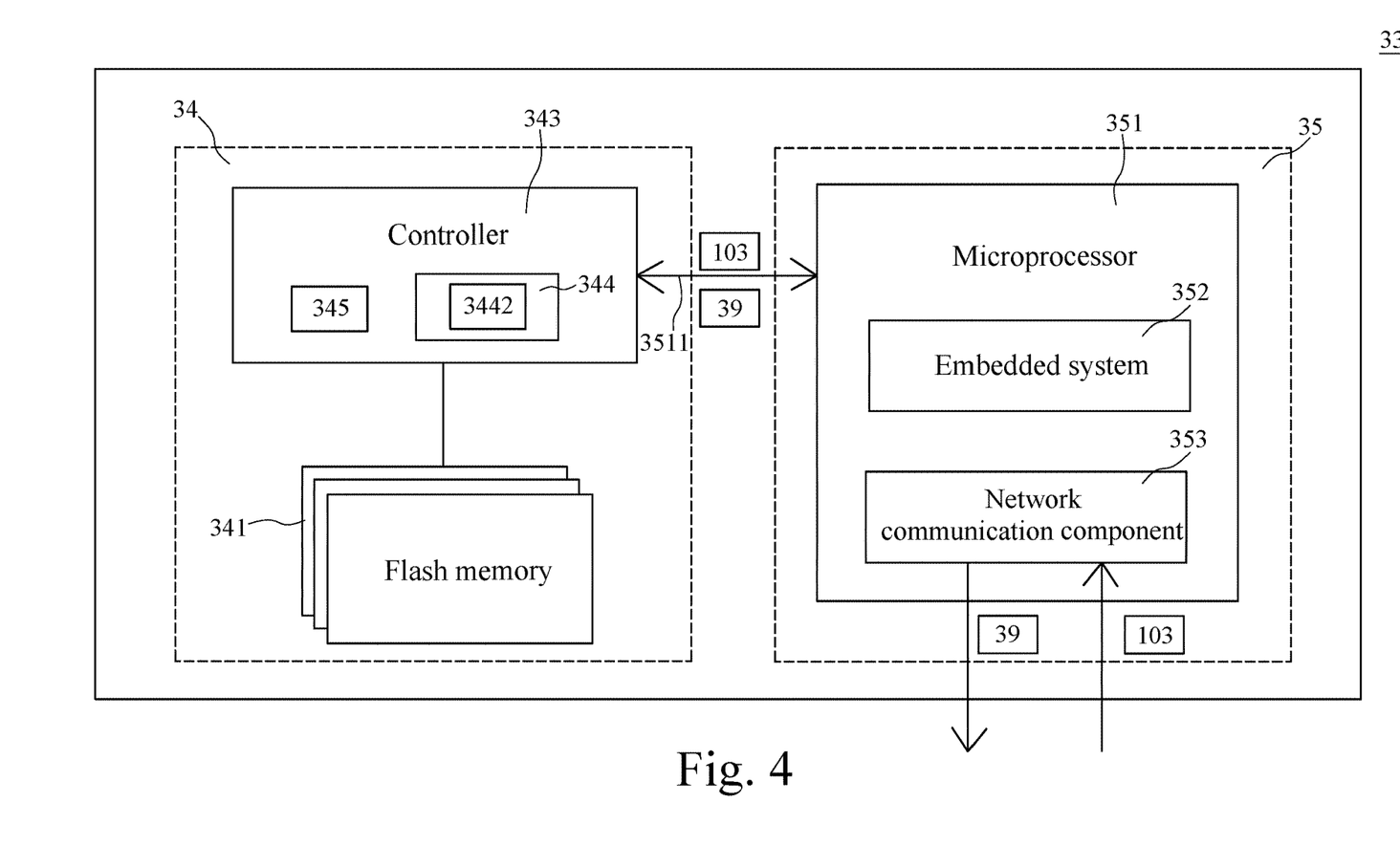
FIG. 4 is a circuit diagram of the electronic apparatus according to another embodiment of the present invention.

Referring to FIG. 4, there is a circuit diagram of the electronic apparatus according to another application embodiment of the present invention, and referring to FIG. 1, simultaneously. As shown in FIG. 1 and FIG. 4, for monitoring a service life of the data storage device 33, the manager of the cloud management platform 10 can control that the electronic apparatus 30 executes an operation for collecting health information of the data storage device 33, and therefore send an instruction 103 for collecting health information of the data storage device 33 to the electronic apparatus 30. After the program execution management unit 35 of the data storage device 33 receives the instruction 103 sent from the cloud management platform 10 via the network communication component 353, the microprocessor 351 of the program execution management unit 35 transmits the instruction 103 to the controller 343 of the data storage unit 34 via the connection line 3511, and then the controller 343 of the data storage unit 34 executes a operation program 3442 for collecting health information of the data storage device 33 according to the requirement of the instruction 103. The controller 343 will generate a file 39 containing the health information of the data storage device 33 after the health information of the data storage device 33 has collected. The program execution management unit 35 receives the file 39 from the controller 343 via the connection line 3511, and transmits the file 39 to the cloud management platform 10 via the network communication component 353. The health information in the file 39 will display on the management interface 11 of the cloud management platform 10 after the cloud management platform 10 receives the file 39. Accordingly, whether the electronic apparatus 30 is in the power-on state or the power-off state, the manager of the cloud management platform 10 can collect the health information of the data storage device 33 by the program execution management unit 35 of the data storage device 33 at any time, and decide whether to replace the data storage device 33 of the electronic apparatus 30 according to the result of analysis of the health information of the data storage device 33.

During the controller 343 reading data from the flash memory 341 of the data storage device 33 or writing data into the flash memory 341 of the data storage device 33, the controller 343 has record some parameters related to the health information of the data storage device 33, such as Raw Bit Error Rate (RBER), Program/Erase cycle (P/E cycle), average erase count, later bad block count, program fail count, unexpected power loss, etc., and these parameters of health information are recorded in a memory unit 345, for example, non-volatile memory (NVM). Afterwards, when the controller 343 executes the operation program 3442 for collecting the health information of the data storage device 33, it may capture these parameters of health information from the memory unit 345, and therefore generate the file 39 containing the health information of the data storage device 33.

Figure 5:
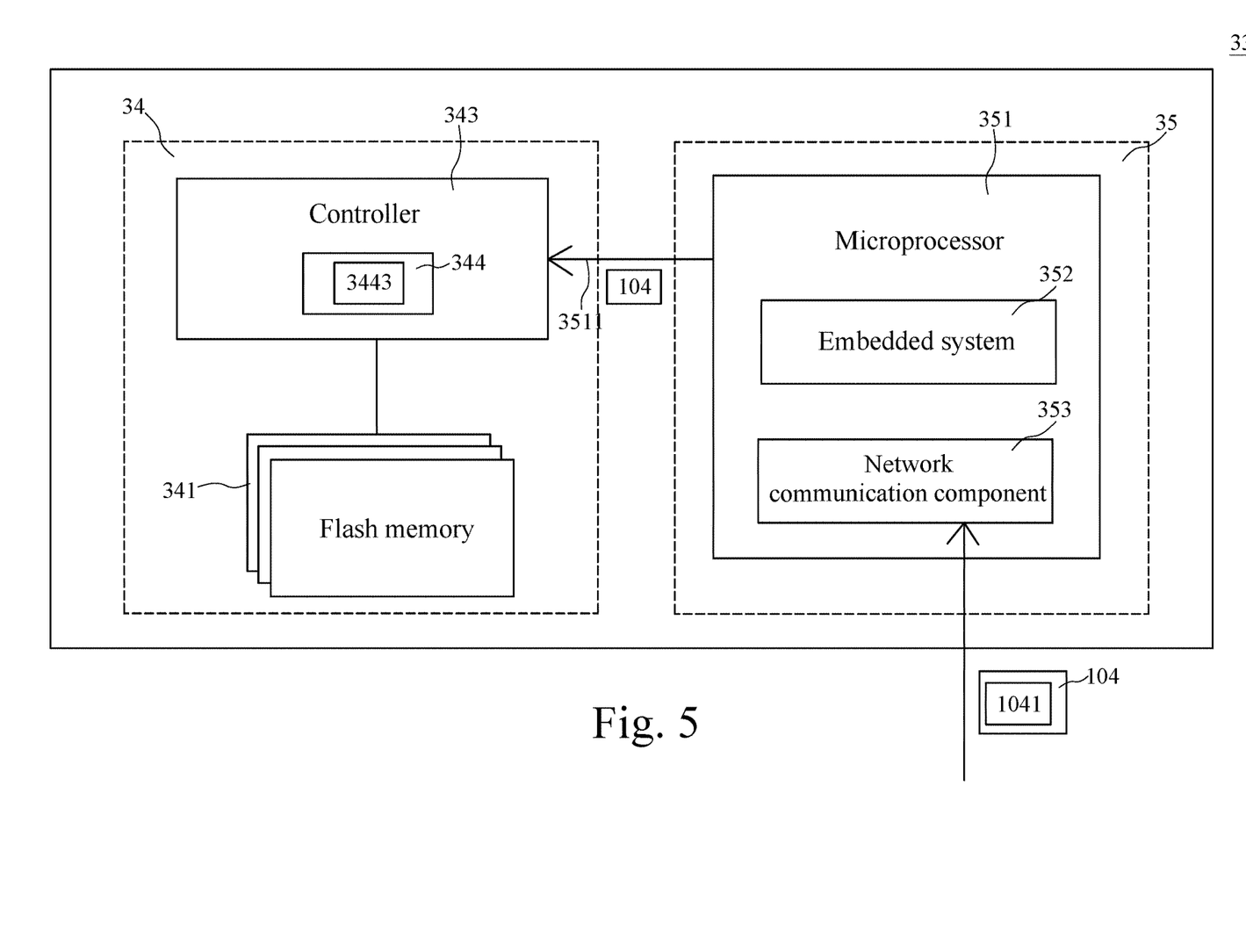
FIG. 5 is a circuit diagram of the electronic apparatus according to another embodiment of the present invention.

Referring to FIG. 5, there is a circuit diagram of the electronic apparatus according to another application embodiment of the present invention, and referring to FIG. 1, simultaneously. In this present application embodiment, the manager of the cloud management platform 10 can execute an operation of updating a firmware of the electronic apparatus 30, as shown in FIG. 1 and FIG. 5. When the manager of the cloud management platform 10 wants that the electronic apparatus 30 executes the operation of updating firmware, he sends an updating firmware instruction 104 includes a firmware updating file 1041 to the electronic apparatus 30 via the management interface 11. After the program execution management unit 35 of the electronic apparatus 30 receives the updating firmware instruction 104 sent from the cloud management platform 10 via the network communication component 353, the microprocessor 351 of the program execution management unit 35 will transmit the updating firmware instruction 104 to the controller 343 of the data storage unit 34 via the connection line 3511, and then the controller 343 of the data storage unit 34 can execute an operation program 3443 for updating firmware to update the firmware 344 by a firmware updating file 1041 in the updating firmware instruction 104. Accordingly, whether the electronic apparatus 30 is in the power-on state or the power-off state, the manager of the cloud management platform 10 can execute the operation program 3443 for updating the firmware 344 of the electronic apparatus 30 by the program execution management unit 35 of the data storage device 33 at any time.

The four embodiments in the above described are only partially implementation of the present invention. In actual application, whether the electronic apparatus 30 is in the power-on state or the power-off state, the manager of the cloud management platform 10 can control the electronic apparatus 30 to execute a variety of operation programs by the program execution management unit 35 of the data storage device 33 at any time.

As the above description, whether the electronic apparatus 30 is in the power-on state or the power-off state, the standby power 53 can be supplied to the data storage device 33 by the standby power circuit 313 that can always keep to supply power so that the data storage device 33 can always maintain in the normal operation. Thus, the manager of the cloud management platform 10 can control the electronic apparatus 30 to execute a variety of operation programs by the program execution management unit 35 of the data storage device 33 at any time according to the actual requirement.

Figure 6:
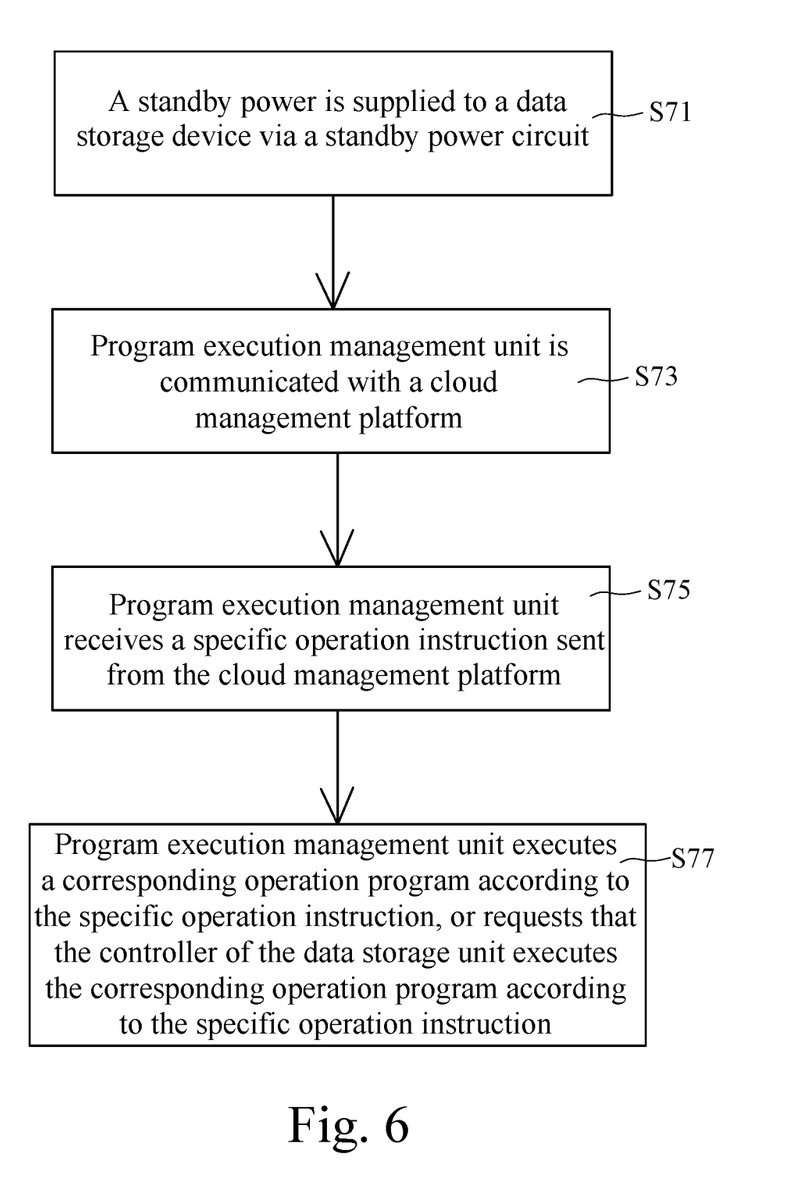
FIG. 6 is a flowchart of a method capable of remotely controlling an electronic apparatus of the present invention.

Referring to FIG. 6, there is shown a flowchart of a method capable of remotely controlling an electronic apparatus according to the present invention. As shown in FIG. 6, firstly, in Step S71, the standby power 53 is supplied to the data storage device 33 of the electronic apparatus 30 by the standby power circuit 313 when the electronic apparatus 30 is in the power-on state or the power off state so that the data storage device 33 can always maintain in the normal operation. In Step S73, the program execution management unit 35 of the data storage device 33 is communicated with the cloud management platform 10 via the network communication component 353. In Step S75, the program execution management unit 35 receives an operation instruction 101, 102, 103, or 104 sent from the cloud management platform 10. In Step S77, after the program execution management unit 35 receives the operation instruction 101, 102, 103, or 104, the embedded system 352 of the program execution management unit 35 determines the operation type of the operation instruction 101, 102, 103, or 104 to decide that the operation instruction 101, 102, 103, or 104 is executed by the microprocessor 351 of the program execution management unit 35 or by the controller 343 of the data storage unit 34. If it is decided that the microprocessor 351 of the program execution management unit 35 executes the operation instruction 101, 102, 103, or 104, the microprocessor 351 can directly execute the corresponding operation program according to the operation instruction 101, 102, 103, or 104. If it is decided that the controller 343 of the data storage unit 34 executes the operation instruction 101, 102, 103, or 104, the microprocessor 351 transmits the operation instruction 101, 102, 103, or 104 to the controller 343 via the connection line 3511 to require that the controller 343 executes the corresponding operation program according to the operation instruction 101, 102, 103, or 104.

In an application embodiment of the present invention, in step S75, the operation instruction received by the microprocessor 351 of the program execution management unit 35 from the cloud management platform 10 is a boot instruction 101. In step S77, the microprocessor 351 of the program execution management unit 35 issues a boot signal 3541, and transmits the boot signal 3541 to the power switch pin 321 via the power-on pin 354 to execute a boot operation program for the electronic apparatus 30. Thus, the electronic apparatus 30 that was in the power-off state originally can be rebooted to enter the power-on state.

In another application embodiment of the present invention, in step S75, the operation instruction received by the microprocessor 351 of the program execution management unit 35 from the cloud management platform 10 is an operating system repairing instruction 102. In step S77, the microprocessor 351 of the program execution management unit 35 transmits the operating system repairing instruction 102 to the controller 343 of the data storage unit 34, the controller 343 of the data storage unit 34 executes the operation program 3441 for restoring operating system according to the operating system repairing instruction 102, and restores the operating system 36 by the operating system restoring file 38. After the operating system 36 has been restored, the microprocessor 351 of the program execution management unit 35 can execute the reboot operation for the electronic apparatus 30 such that the electronic apparatus 30 can resume the normal operation, again.

In another application embodiment of the present invention, in step S75, the operation instruction received by the microprocessor 351 of the program execution management unit 35 from the cloud management platform 10 is an instruction 103 for collecting health information of the data storage device 33. In step S77, the microprocessor 351 of the program execution management unit 35 transmits the instruction 103 to the controller 343 of the data storage unit 34, the controller 343 of the data storage unit 34 executes the operation program 3442 for collecting health information of the data storage device 33 according to the instruction 103, and therefore generates a file 39 containing the health information of the data storage device 33. Afterwards, the program execution management unit 35 receives the file 39 from the controller 343, and transmits the file 39 to the cloud management platform 10.

In another application embodiment of the present invention, in step S75, the operation instruction received by the microprocessor 351 of the program execution management unit 35 from the cloud management platform 10 is an updating firmware instruction 104 includes a firmware updating file 1041. In step S77, the microprocessor 351 of the program execution management unit 35 transmits the updating firmware instruction 104 to the controller 343 of the data storage unit 34 to require that the controller 343 of the data storage unit 34 executes the operation program 3443 for updating firmware according to the updating firmware instruction 104, such that the controller 343 can update the firmware 344 by the firmware updating file 1041 in the updating firmware instruction 104.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A system capable of remotely controlling electronic apparatus, comprising:
   a cloud management platform comprising a management interface; and
   an electronic apparatus comprising:
      a motherboard comprising a standby power circuit; and
      a data storage device, connected to the standby power circuit, and comprising a data storage unit and a program execution management unit, wherein the data storage unit comprises a plurality of flash memories and a controller connected to the flash memories, the program execution management unit comprises a microprocessor and a network communication component connected to the microprocessor, and is communicated with the cloud management platform via the network communication component, the microprocessor of the program execution management unit is connected to the controller of the data storage unit via a connection line;

wherein a standby power is supplied to the data storage device via the standby power circuit, the data storage device can maintain in a normal operation via the standby power whether the electronic apparatus is in a power-on state or a power-off state; when the cloud management platform transmits a specific operation instruction to the program execution management unit, the microprocessor of the program execution management unit executes a corresponding operation program according to the specific operation instruction, or transmits the specific operation instruction to the data storage unit via the connection line to request that the controller of the data storage unit executes the corresponding operation program according to the specific operation instruction.

2. The system according to claim 1, wherein the electronic apparatus further comprises an electronic component unit, the motherboard further comprises a main power circuit, the electronic component unit is disposed on the motherboard and connected to the main power circuit; when the electronic apparatus is in the power-on state, a main power is supplied to the electronic component unit via the main power circuit; when the electronic apparatus is in the power-off state, the main power circuit will be cut off, and therefore the main power is unable to be supplied to the electronic component unit.

3. The system according to claim 2, further comprising a power supply device that is connected to the main power circuit and the standby power circuit of the motherboard, and used to provide the main power and the standby power.

4. The system according to claim 1, wherein the microprocessor of the program execution management unit is equipped with an embedded system, the cloud management platform can control and manage the execution of the operation program via the embedded system of the program execution management unit.

5. The system according to claim 1, wherein the specific operation instruction sent from the cloud management platform is a boot instruction, the microprocessor further comprises a power-on pin connected to a power switch pin disposed on the motherboard; when the electronic apparatus is in the power-off state and the program execution management unit receives the boot instruction from the cloud management platform, the microprocessor of the program execution management unit transmits a boot signal to the power switch pin via the power-on pin so as to execute a boot program for the electronic apparatus.

6. The system according to claim 1, wherein the flash memories are formed with a data sector, the data sector comprises a first data partition and a second data partition, an operating system is installed in the first data partition, the second data partition stores an operating system restoring file, the specific operation instruction sent from the cloud management platform is an operating system repairing instruction; when the program execution management unit receives the operating system repairing instruction, the microprocessor of the program execution management unit sends the operating system repairing instruction to the controller of the data storage unit, and therefore requests that the controller of the data storage unit executes an operation program for repairing the operating system according to the operating system repairing instruction so as to restore the operating system of the first data partition by the operating system restoring file of the second data partition.

7. The system according to claim 6, wherein the microprocessor of the program execution management unit is equipped with an embedded system used for monitoring an operation condition of the operating system; when the embedded system of the microprocessor monitors that the operating system installed in the data storage unit is abnormal, the embedded system of the microprocessor reports an operating system fault message to the cloud management platform, and then the cloud management platform transmits the operating system repairing instruction to the program execution management unit according to the operating system fault message.

8. The system according to claim 6, wherein the microprocessor of the program execution management unit further comprises an input and output pin connected to a reset pin disposed on the motherboard; after the operating system has been restored, the microprocessor of the program execution management unit sends a reset signal to the reset pin via the input and output pin to execute a reboot operation for the electronic apparatus.

9. The system according to claim 1, wherein the specific operation instruction sent from the cloud management platform is an instruction for collecting health information of the data storage device; when the program execution management unit receives the instruction for collecting health information of the data storage device, the microprocessor of the program execution management unit sends the instruction for collecting health information of the data storage device to the controller of the data storage unit via the connection line, and requests that the controller of the data storage unit executes an operation program for collecting health information of the data storage device according to the instruction for collecting health information of the data storage device so as to generate a file containing the health information of the data storage device; afterwards, the program execution management unit receives the file containing the health information of the data storage device from the controller via the connection line, and transmits the file containing the health information of the data storage device to the cloud management platform via the network communication component.

10. The system according to claim 1, wherein the specific operation instruction sent from the cloud management platform is an updating firmware instruction including a firmware updating file; when the program execution management unit receives the updating firmware instruction, the microprocessor of the program execution management unit transmits the updating firmware instruction to the controller of the data storage unit to require that the controller of the data storage unit executes an updating firmware operation program according to the updating firmware instruction, and thus the controller of the data storage unit updates a firmware by the firmware updating file of the updating firmware instruction.

11. The system according to claim 1, wherein the connection line is a connection line conforming to RS232 specification, UART specification, or I2C specification.

12. The system according to claim 1, wherein the data storage device is a data storage device having a SATA transmission interface, a PCIe transmission interface or an M.2 transmission interface.

13. The system according to claim 1, wherein the network communication component is a WiFi communication component, an Ethernet communication component, or a 3G 4G or 5G communication component.

14. A method capable of remotely controlling electronic apparatus, which is applied to a system capable of remotely controlling electronic apparatus, the system comprises a cloud management platform and an electronic apparatus, the electronic apparatus comprises a motherboard and a data storage device, the motherboard comprises a standby power circuit, the data storage device comprises a data storage unit and a program execution management unit, the data storage unit comprises a plurality of flash memories and a controller, the program execution management unit comprises a microprocessor that is having a network communication function and equipped with an embedded system, the method capable of remotely controlling the electronic apparatus comprising steps of:
supplying a standby power to the data storage device via the standby power circuit when the electronic apparatus is in a power-on state or in a power-off state;
requiring the program execution management unit to be communicated with the cloud management platform;
requiring the program execution management unit to receive a specific operation instruction sent from the cloud management platform; and
requiring the program execution management unit to execute a specific operation program according to the specific operation instruction, or transmit the specific operation instruction to the controller of the data storage unit to request that the controller of the data storage unit executes the corresponding operation program according to the specific operation instruction.

15. The method according to claim 14, wherein the specific operation instruction sent from the cloud management platform is a boot instruction, the electronic apparatus is in the power-off state, the method capable of remotely controlling the electronic apparatus further comprising steps of:
requiring the microprocessor of the program execution management unit to send a boot signal to a power switch pin disposed on the motherboard to execute a boot program for the electronic apparatus.

16. The method according to claim 14, wherein the flash memories are formed with a data sector, the data sector comprises a first data partition and a second data partition, an operating system is installed in the first data partition, the second data partition stores an operating system restoring file, the specific operation instruction sent from the cloud management platform is an operating system repairing instruction, the method capable of remotely controlling the electronic apparatus further comprising steps of:
transmitting the operating system repairing instruction to the controller of the data storage unit by the microprocessor of the program execution management unit when the program execution management unit receives the operating system repairing instruction;
executing an operating system repairing program by the controller of the data storage unit according to the operating system repairing instruction to restore the operating system of the first data partition by the operating system restoring file of the second data partition; and
sending a reset signal to a reset pin disposed on the motherboard by the microprocessor of the program execution management unit to execute a reboot operation for the electronic apparatus.

17. The method according to claim 14, wherein the specific operation instruction sent from the cloud management platform is an instruction for collecting health information of the data storage device, the method capable of remotely controlling the electronic apparatus further comprising steps of:
transmitting the instruction for collecting health information of the data storage device to the controller of the data storage unit by the microprocessor of the program execution management unit when the program execution management unit receives the instruction for collecting health information of the data storage device;
executing an operation program for collecting health information of the data storage device by the controller of the data storage unit according to the instruction for collecting health information of the data storage device to generate a file containing the health information of the data storage device; and
requiring the program execution management unit to receive the file containing the health information of the data storage device from the controller of the data storage unit and transmit the file containing the health information of the data storage device to the cloud management platform.

18. The method according to claim 14, wherein the specific operation instruction sent from the cloud management platform is an updating firmware instruction including a firmware updating file, the method capable of remotely controlling the electronic apparatus further comprising steps of:
transmitting the updating firmware instruction to the controller of the data storage unit by the microprocessor of the program execution management unit when the program execution management unit receives the updating firmware instruction; and
executing an updating firmware operation program by the controller of the data storage unit to update a firmware in the controller of the data storage unit according to the firmware updating file in the updating firmware instruction.

* * * * *